US005757279A

United States Patent [19]

Fujiwara

[11] Patent Number: 5,757,279

[45] Date of Patent: May 26, 1998

[54] SCROLLING CONTROL FOR PAGER

[75] Inventor: Yoji Fujiwara, Yokohama, Japan

[73] Assignee: Matsushita Electric Industrial Co., Ltd., Japan

[21] Appl. No.: 574,430

[22] Filed: Dec. 15, 1995

[30] Foreign Application Priority Data

Dec. 28, 1994 [JP] Japan .................................... 6-326904

[51] Int. Cl.[6] ........................................ H04Q 7/14

[52] U.S. Cl. ................................ 340/825.44; 455/38.4

[58] Field of Search ..................... 340/825.44, 825.48, 340/311.1, 870.38; 345/160, 123, 124, 145, 146, 172, 56; 455/38.4, 158.4; 341/23

[56] References Cited

U.S. PATENT DOCUMENTS

| | | | |
|---|---|---|---|
| 4,821,021 | 4/1989 | Ide et al. | 340/311.1 |
| 5,107,259 | 4/1992 | Weitzen et al. | 340/825.44 |
| 5,184,120 | 2/1993 | Schultz | 340/870.38 |
| 5,396,264 | 3/1995 | Falcone | 345/146 |
| 5,398,022 | 3/1995 | Lipp | 340/825.44 |
| 5,430,436 | 7/1995 | Fennell | 340/825.44 |
| 5,483,595 | 1/1996 | Owen | 340/825.44 X |

*Primary Examiner*—Edwin C. Holloway, III
*Attorney, Agent, or Firm*—Rossi & Associates

[57] ABSTRACT

A pager having a first switch for selecting a scrolling direction, a second switch, a first display for displaying the selected scrolling direction, and a second display for displaying a received message with scrolling in the selected scrolling direction in response to the second switch. With only two switches, a next message, a previous message, a next page of the displayed message and a previous page of message can be displayed. Moreover, the first switch can select modes in addition to selection of the scrolling direction. Either of first and second switches can be omitted with an analyzing portion for analyzing an operation pattern of the remaining switch to provided first and second command signals for controlling the selection of the scrolling direction or modes and the controlling of the scrolling respectively. Therefore, with a few switches, various displaying of the received message can be provided and a cost of manufacturing this pager is reduced.

4 Claims, 8 Drawing Sheets

SCROLLING CONTROL FOR PAGER

BACKGROUND OF THE INVENTION

1. Field of the Invention

This invention relates to a pager for receiving a radio wave paging signal, alerting the reception of a message included in the radio wave paging signal, and displaying the message.

2. Description of the Prior Art

A pager for receiving a radio wave paging signal, alerting the reception of a message included in the radio wave paging signal, and displaying the message with scrolling responsive to operation switches is known. There are various types of scrolling in accordance with the number of operation switches provided to the pager. FIGS. 6 to 8 are illustrations of prior art displaying operations. FIG. 6 shows an example of displaying with one switch "a", FIG. 7 shows an example of displaying with three switches "b", "c", and "d". FIG. 8 shows an example of displaying with four switches "e", "f", "g" and "h". In these examples of the prior art displaying operations, it is assumed that four messages M1 to M4 have been received, wherein the number of character code data included in messages M1, M2, and M4 are a larger than the horizontal size for displaying a predetermined number of font image blocks corresponding to the character code data. Therefore, these messages are displayed with scrolling.

Displaying operations of prior examples of the prior art pagers will be described. In FIG. 6, when a user depresses the switch "a" in the condition where a portion PAGE1—1 of the message M1 is displayed in the message displaying mode, a next portion PAGE1-2 of the same message M1 is displayed. Then, when the user depresses the switch "a" again, the following portion PAGE1-3 of the same message M1 is displayed. Similarly, a portion PAGE2-1 of the message M2, a portion PAGE 2—2 of the message are displayed in response to the depression of the switch "a". That is, messages M1 to M4 are scrolled in the predetermined direction.

In the example shown in FIG. 7, when the user depresses the switch "b" in the condition where the portion PAGE1—1 of the message M1 is displayed, the portion PAGE2-1, a top of the next message M2, is displayed and the user can making scrolling operations in the right and left directions by depression of the switches "c" and "d" respectively.

In the example shown in FIG. 8, depression of switch "e" makes a scrolling to display a next message, depression of switch "f" makes a scrolling to display a previous message, and the user can make scrolling operations in the right and left directions by depression of the switches "g" and "h" respectively.

As described, in the prior art displaying operations, when the number of the switch is one, the displaying operation is inconvenient for the user and when the number of the switches is increased, the display operation is convenient but these switches occupy a larger surface area of the pager having a portable size. Moreover, if a lager number of switches are mounted on the surface area of the pager having a predetermined area, the size of switches should be small, so that there is a difficulty in operation of these small sized switches.

SUMMARY OF THE INVENTION

The aim of the present invention is to provide an improved pager.

A pager having a first switch for selecting a scrolling direction, a second switch, a first display for displaying the selected scrolling direction, and a second display for displaying a received message with scrolling in the selected scrolling direction in response to the second switch. With only two switches, a next message, a previous message, a next page of the displayed message and a previous page of message can be displayed. Moreover, the first switch can select modes in addition to selection of the scrolling direction. Either of first and second switches can be omitted with an analyzing portion for analyzing an operation pattern of the remaining switch to provided first and second command signals for controlling the selection of the scrolling direction or modes and the controlling of the scrolling respectively. Therefore, with a few switches, various displaying of the received message can be provided and a cost of manufacturing this pager is reduced.

According to the present invention there is provided a first pager having a plurality of predetermined functions, comprising: a receiving portion for receiving a radio wave signal including first identification code information and message information; a first storing portion for storing second identification code information; a second storing portion for storing font image data; a comparing portion for comparing the first identification information with the second identification code information; a third storing portion for storing the message information when the first identification information agrees with the second identification information; first and second switches responsive to operations of a user respectively; a selection portion for selecting one of the plurality of predetermined functions in response to the first switch; a first display portion for displaying the selected function; a second display portion, having a predetermined display area, for displaying the message information; and a control portion for effecting the selected one of the plurality of functions in response to the second switch, the plurality of predetermined functions including a display function for displaying the message information using the font image data to have a displayed image on the second display portion at the predetermined display area with scrolling the displayed image controlled by the second switch.

According to this invention, there is provided a second pager, having a plurality of predetermined functions, comprising: a receiving portion for receiving a radio wave signal including first identification code information and message information; a first storing portion for storing second identification code information; a second storing portion for storing font image data; a comparing portion for comparing the first identification information with the second identification code information; a third storing portion for storing the massage information when the first identification information agrees with the second identification information; first and second switches responsive to operations of a user respectively; a selection portion for selecting one of the plurality of predetermined functions in response to the first switch; a first display portion for displaying the selected one of the plurality of predetermined functions; a second display portion, having a predetermined display area, for displaying the message information in a first direction; and a control portion for effecting the selected function in response to the second switch, the plurality of predetermined functions including a first display function for displaying the message information using the font image data to have a displayed image on the second display portion at the predetermined display area with scrolling the displayed image controlled by the second switch in the first direction and a second display function for displaying the message information with scrolling the displayed image controlled by the second switch in a second direction which is opposite to the first direction.

According to this invention, there is provided a third pager, having a plurality of predetermined functions, comprising: a receiving portion for receiving a radio wave signal including first identification code information and a block of message information; a first storing portion for storing second identification code information; a second storing portion for storing font image data; a comparing portion for comparing the first identification information with the second identification code information; a third storing portion for storing the block message information every the first identification information agrees with the second identification information to accumulate a plurality of the blocks of message information; first and second switches responsive to operations of a user respectively; a selection portion for selecting one of the plurality of predetermined functions in response to the first switch; a first display portion for displaying the selected one of the plurality of predetermined functions; a second display portion, having a predetermined display area, for displaying one of the plurality of the block of message information in a first horizontal direction; a control portion for effecting the selected function in response to the second switch, the plurality of predetermined functions including a first display function for displaying a first block of the plurality of blocks of message information using the font image data to have a displayed image at the predetermined display area of the second display with scrolling the displayed image controlled by the second switch in the first horizontal direction, a second display function for displaying the first block of the plurality of blocks of message information with scrolling the displayed image controlled by the second switch in a second horizontal direction which is opposite to the first horizontal direction, a third display function for displaying a second block of the plurality of blocks of message information, and a fourth display function for displaying the block of the plurality of blocks of message information.

In the above mentioned pagers, the first display portion may display the selected display function, such that the first horizontal direction is indicated when the selection portion selects the first display function, such that the second horizontal direction is indicated when the control portion selects the second display function, such that a downward direction is indicated when the control portion selects the third display function, and such that an upward direction is indicated when the control portion selects the fourth display function.

In the above mentioned pagers, the plurality functions may further include an erasing function and the control portion may erase at least one of plurality of blocks of the message stored in the third storing portion.

In the above mentioned pagers, the selection portion may select the one of the plurality of predetermined functions in response to the first switch such that the one of the plurality of predetermined functions is selected recurrently in a predetermined order.

According to this invention, there is provided a fourth pager, having a plurality of predetermined functions, comprising: a receiving portion for receiving a radio wave signal including first identification code information and message information; a first storing portion for storing second identification code information; a second storing portion for storing font image data; a comparing portion for comparing the first identification information with the second identification code information; a third storing portion for storing the massage information when the first identification information agrees with the second identification information; a switch responsive to an operation of a user respectively; an analyzing portion for analyzing the operation and classifying the operation into first and second patterns; a selection portion for selecting one of the plurality of predetermined functions when the analyzing portion classifies the operation into the first pattern; a first display portion for displaying the selected one of the plurality of predetermined functions; a second display portion, having a predetermined display area, for displaying the message information; a control portion for effecting the selected one of the plurality of predetermined functions when the analyzing portion classifies the operation into the second pattern, the plurality of predetermined functions including a display function for displaying the message information using the font image data to have a displayed image at the predetermined display area of the second display with scrolling the displayed image controlled when the analyzing portion classifies the operation into the second pattern.

In the fourth pager, the analyzing portion may have a time measuring portion for measuring a duration of the operation and the analyzing portion classifies the operation into the first and second patterns in accordance with the duration.

In the fourth pager, the analyzing portion have a time measuring portion for measuring a predetermined interval in response to the operation and the analyzing portion classifies the operation into first and second patterns in accordance with whether or not the operation is further made within the predetermined interval.

According to this invention, there is provided a fifth pager having a plurality of predetermined functions, comprising: a receiving portion for receiving a radio wave signal including first identification code information and message information; a first storing portion for storing second identification code information; a second storing portion for storing font image data; a comparing portion for comparing the first identification information with the second identification code information; a third storing portion for storing the massage information when the first identification information agrees with the second identification information; first and second switches responsive to operations of a user respectively; a selection portion for selecting one of the plurality of predetermined functions in response to the first switch; a first display portion for displaying the selected function; a second display portion, having a predetermined display area, for displaying the message information; and a control portion for effecting the selected one of the plurality of functions in response to the second switch.

In the fifth pager, the plurality of predetermined functions includes a display function for displaying the message information using the font image data to have a displayed image on the second display portion at the predetermined display area with scrolling the displayed image controlled by the second switch and an erasing function for erasing the message information stored in the third storing portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
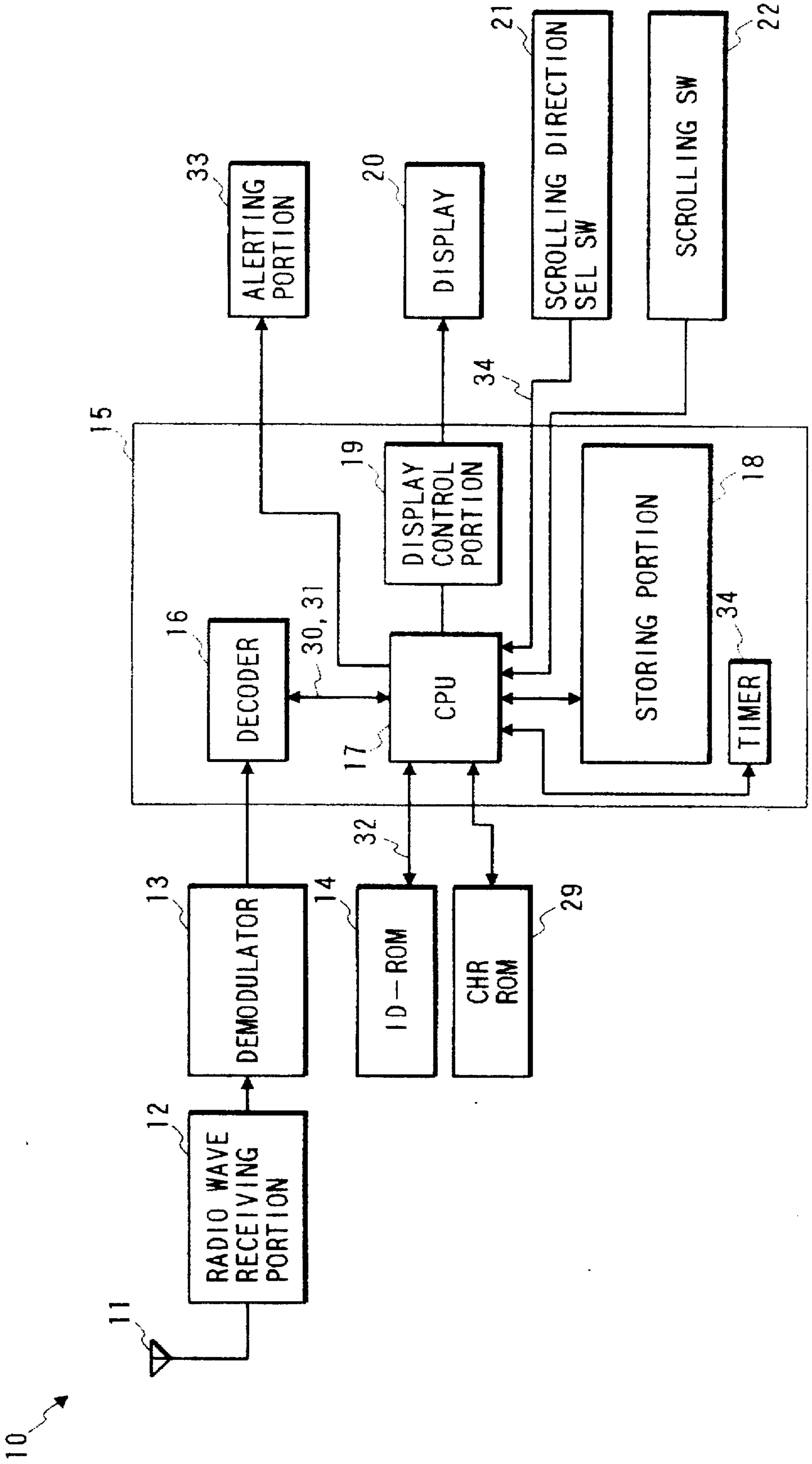
FIG. 1 is a block diagram of a pager according to a first embodiment of this invention.

FIG. 1 is a block diagram of a pager according to the first embodiment of this invention. The pager of this embodiment comprises an antenna 11 for receiving a radio wave paging signal 10 including an identification code data and message information, a radio wave receiving portion 12 for receiving the radio wave paging signal from the antenna 11, a demodulator 13 for demodulating the received radio wave paging signal, a decoder 16 for decoding an output of the demodulator 13 to reproduce a paging signal including the identification code data 30 and the message information 31, an ID ROM 14 for storing data of an identification code 32 of this pager, a scrolling direction selection switch 21, a scrolling switch 22, a central processing unit (cpu) 17, a storing portion 18, comprising a REM, for storing received messages from the decoder via the central processing unit 17, a display control portion 19 for effecting a controlling of displaying, and a display 20 for displaying at least a portion of a message, a timer 34 for measuring an interval, and an alerting portion 33. The decoder 16, the central processing unit 17, the display control portion 19 and the storing portion 18, and the timer 34 are included in a control section 15.

The antenna 11 receives the radio wave paging signal 10, transmitted from a base station (not shown). The radio wave paging signal 10 includes the identification code data and the message information. The radio wave receiving portion 12 receives the radio wave paging signal from the antenna 11. The demodulator 13 demodulates the received radio wave paging signal from the radio wave receiving portion 12. The decoder 16 decodes the output of the demodulator 13 to reproduce the paging signal including the identification code data 30 and the message information 31. The central processing unit 17 receives the paging signal and compares the received identification code data 30 with the identification code 32 of this pager stored in the ID ROM 14. When the received identification code data 30 agrees with the identification code 32 of this pager, the central processing unit 17 stores the message information represented by character codes or the like in the reproduced paging signal in the storing portion 18 and generates an alerting sound and emits a light to inform the user of the reception of the radio wave paging signal directed to this pager by the alerting portion 33. The central processing unit 17 stores a block of message information every reception of the radio wave paging signal directed to this pager in the storing portion 18. Therefore, the storing portion 18 has a capacity for storing a plurality of blocks of message information. In response to an operation of the scrolling direction switch 21 or the scrolling switch 22, the central processing unit 17 enters a display mode. Then, central processing unit 17 controls the display control portion 19 in response to the scrolling direction selection switch 21 and the scrolling switch 22 to display the messages stored in the storing portion 18 on the display 20. For example, a first coming message or the recently coming message is displayed.

Figure 2A:
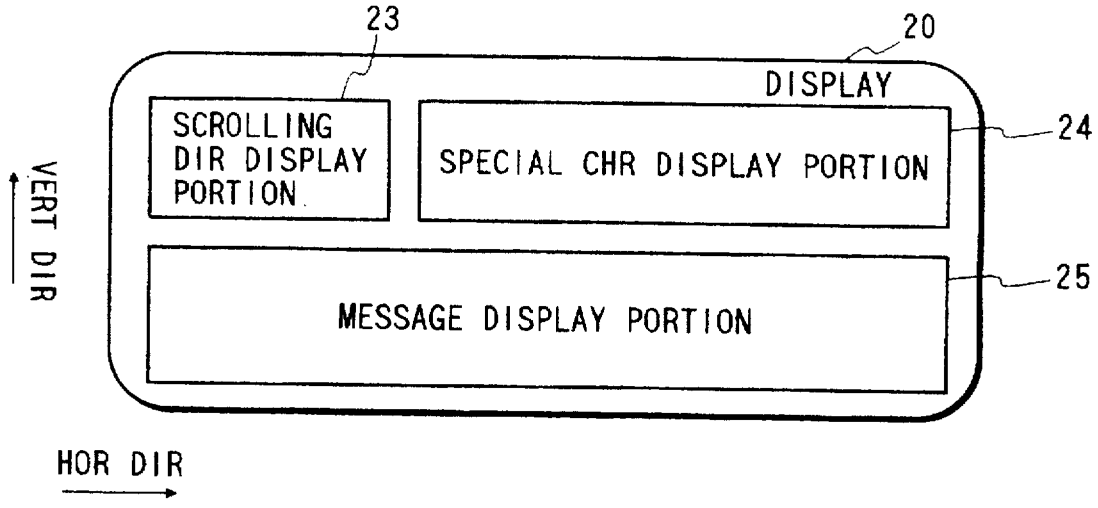
FIG. 2A is an illustration of the first embodiment showing an exterior view of the display shown in FIG. 1.
Figure 2B:
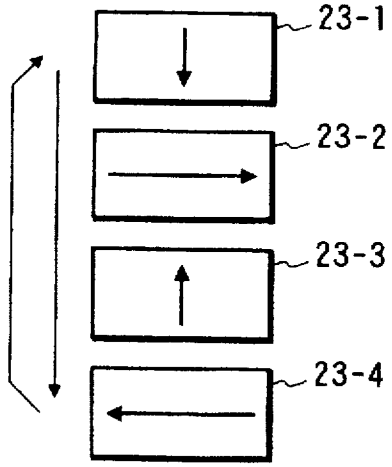
FIG. 2B is an illustration of the first embodiment showing images displayed on the scrolling direction display portion shown in FIG. 2A.

FIG. 2A is an illustration of the first embodiment showing an exterior view of the display 20 shown in FIG. 1. FIG. 2B is an illustration of the first embodiment showing images displayed on the scrolling direction display portion 23 shown in FIG. 2A.

The display 20 has three display portions, that is, a scrolling direction display portion 23 for showing a scrolling direction, a special character display portion 24, and a message display portion 25. The message display portion 25 comprises a dot matrix display, such as a liquid crystal display, for displaying a predetermined number of font images stored in the character ROM 24 in the horizontal direction. The scrolling direction display portion 23 also comprises a dot matrix display such as a liquid crystal display and the arrows 23-1 to 23-4 are displayed using font images stored in the character ROM 24. However, a non-dot matrix display can be used for the scrolling direction display portion 23. For example, one of four LEDs covered with masks having transparent arrow images directed different directions is selectively turned on.

The scrolling direction display portion 23 displays one of arrows shown in FIG. 2B. That is, the central processing unit 17 changes the scrolling direction in response to the scrolling direction selection switch 21 and controls the display portion 19 to display one of arrows on the scrolling direction display portion 23 in accordance the scrolling direction selected using image data stored in the character ROM 24. More specifically, the central processing unit 17 changes the scrolling direction in response to the scrolling direction selection switch 21 in the predetermined order as shown in FIG. 2B, that is, in an initial condition, the scrolling direction is the downward direction shown by an arrow 23-1 for displaying the next message in the predetermined order, then, in response to the scrolling direction selection switch 21, the scrolling direction is changed to the right and the arrow 23-2 is displayed for displaying the following portion (page) of the present message, a further depression of the scrolling direction selection switch 21 changes the scrolling direction to upward direction as shown by the arrow 23-3 for displaying a previous message in the predetermined order, and a still further depression of the scrolling direction selection switch 21 changes the scrolling direction to the left for displaying previous portion (page) of the present message. The order of the plurality of blocks of message information begins from the first coming message or a recently coming message in this embodiment. However, there are various modifications.

Figure 3:
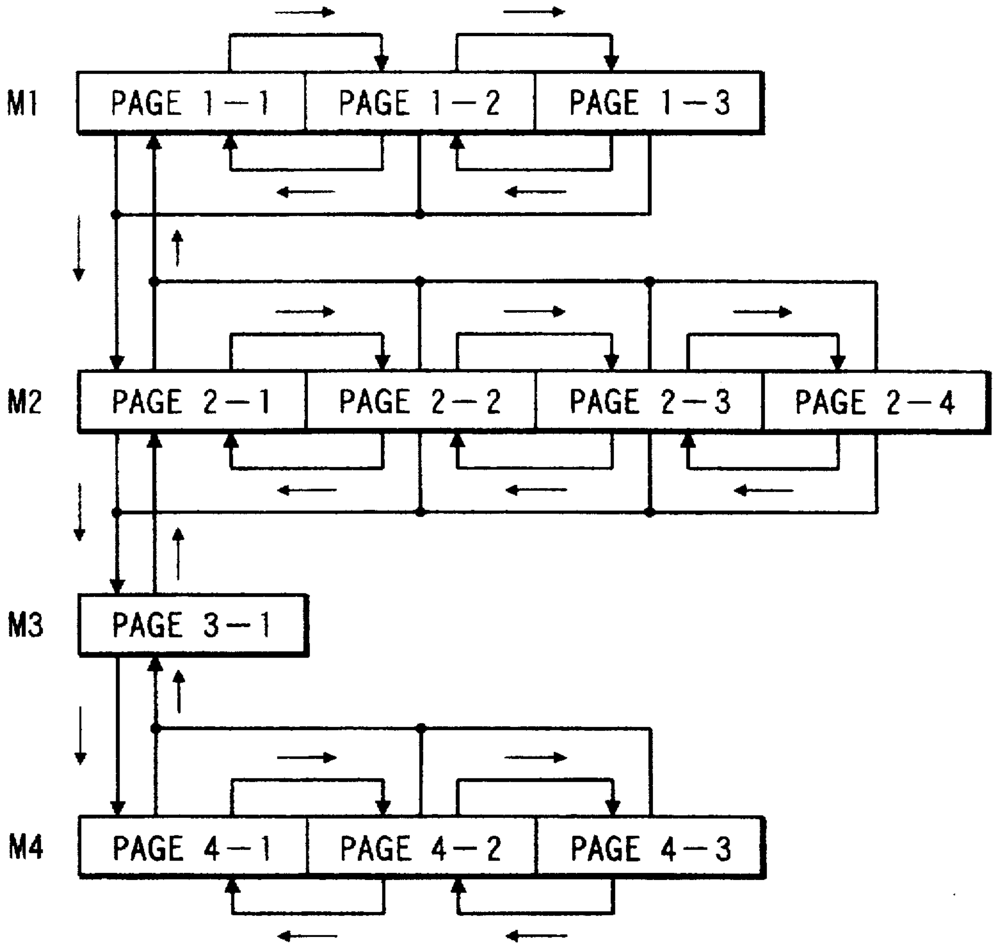
FIG. 3 is an illustration of the first embodiment illustrating displaying operations.

FIG. 3 is an illustration of the first embodiment illustrating displaying operations. It is assumed that four messages M1 to M4 have been received and stored in the storing portion 18, wherein message information M1, M2, M4 have a larger number of character codes than the number of font images to be displayed on the message display portion 25, so that a whole of each of these messages cannot be displayed at the same time. Therefore, a scrolling is necessary to display a whole of each of these messages. The scrolling is made every page corresponding the maximum number of font images once displayed on the message display portion 25.

Displaying operation of the first embodiment will be described. In FIG. 3, when the user depresses the scrolling direction selection switch 21 or the scrolling switch 22, the central processing unit 17 enters the display mode and reads the first portion of the message M1, a page 1—1, and displays it on the message display portion 25. In this condition, the central processing unit 17 displays the arrow 23-1 for scrolling downward on the scrolling direction display portion 23 and displays the page 1—1 of the message M1 on the message display portion 25.

In this condition, if the user desires to watch the next message M2, the user depresses the scrolling switch 22. Then, the scrolling is made downward as displayed on the scrolling direction display portion 23 by the arrow 23-1. That is, the central processing unit 17 reads the first page 2-1 of the next message M2 from the storing portion 18 and displays it on the message display portion 25.

In the condition where the first page PAGE2-1 of the message M2 is displayed in the message display portion 25, if the scrolling direction selection switch 21 is depressed, the central processing unit 17 displays the arrow 23-2 on the scrolling direction display portion 23 and the scrolling direction is changed to the right. If the scrolling direction selection switch 21 is further depressed the central processing unit 17 displays the arrow 23-3 on the scrolling direction display portion 23 and the scrolling direction is changed to the upward direction. If the scrolling direction selection switch 21 is still further depressed the central processing unit 17 displays the arrow 23-1 instead of the arrow 23-4 on the scrolling direction display portion 23 because there is no previous portion of the message M2. If there is a previous portion, the scrolling direction is changed to the left.

In the condition where the page PAGE2-1 of the message M2 is displayed in the message display portion 25, if the arrow 23-2 is displayed on the scrolling direction display portion 23 and the scrolling switch 22 is depressed, the central processing unit 17 displays the following page 2—2 on the message display portion 25. In the condition where the page PAGE2-1 of the message M2 is displayed in the message display portion 25, if the arrow 23-1 is displayed on the scrolling direction display portion 23 and the scrolling switch 22 is depressed, the central processing unit 17 displays the page 1—1 on the message display portion 25. Similarly, if the arrow 23-1 is displayed and the scrolling switch 22 is depressed, the central processing unit 17 displays a page 3-1. In the condition where the page PAGE2—2 of the message M2 is displayed in the message display portion 25, if the scrolling direction selection switch 21 is successively depressed, the display on the scrolling direction display portion 23 is changed from the arrows 23-1 to 23-4 in the predetermined order and the scrolling direction is changed as shown by the arrows every depression of the scrolling direction selection switch 21.

Moreover, in the condition where the page PAGE2—2 of the message M2 is displayed in the message display portion 25, if the scrolling switch 22 is depressed and the scrolling direction is indicated by the arrow 23-1, the central processing unit 17 displays the page 3-1 on the message display portion 25, if the scrolling direction is indicated by the arrow 23-2, the central processing unit 17 displays the page 2-3 on the message display portion 25, if the scrolling direction is indicated by the arrow 23-3, the central processing unit 17 displays the page 1—1 on the message display portion 25, and if the scrolling direction is indicated by the arrow 23-4, the central processing unit 17 displays the page 2-1 on the message display portion 25.

As mentioned above, in the message display mode, the scrolling direction is selected by the scrolling direction selection switch 21 and then, the scrolling is made in response to the depression of the scrolling switch 22, so that the scrolling is capable in the four directions with only two switches.

Figure 4B:
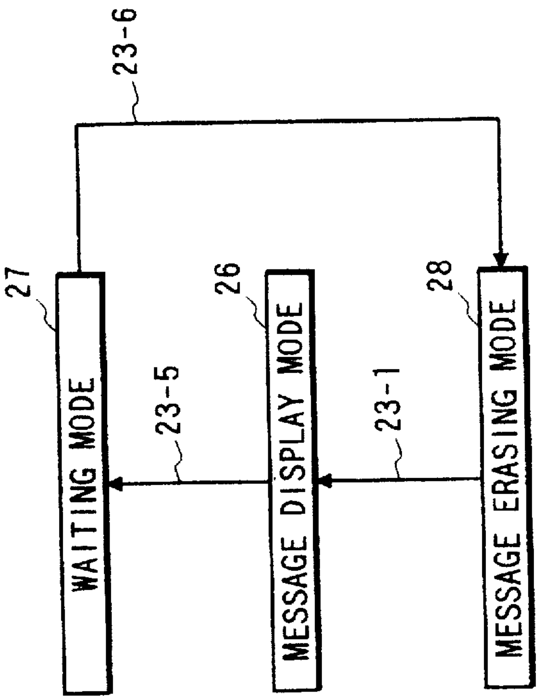
FIG. 4B is an illustration of a second modification of the first embodiment.
Figure 4A:
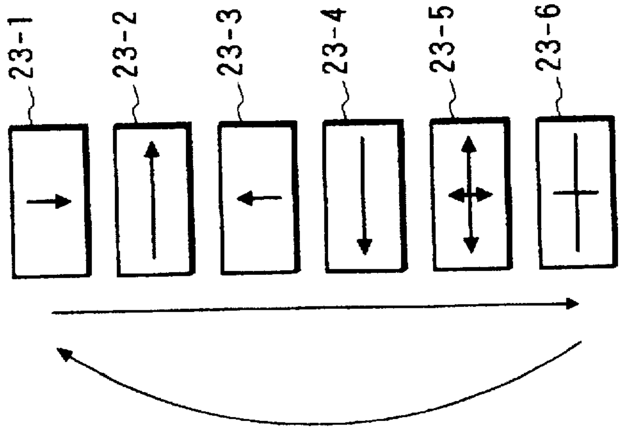
FIG. 4A is an illustration of a first modification of the first embodiment.

FIGS. 4A and 4B are illustrations of the first modification of the first embodiment.

In addition of the scrolling directions represented by arrows 23-1 to 23-4, other modes can be provided. That is, a waiting mode is displayed by the mark 23-5 and a message erasing mode is displayed by the mark 23-6. In the condition that the mark 23-5 is displayed, when the user depresses the scrolling switch 22, the central processing unit 17 enters the waiting mode and waits the paging signal directed to this pager. In the waiting mode, the scrolling direction display portion 23 displays the mark 23-5 and when the scrolling direction selection switch 21 is depressed in this condition, the central processing unit 17 enters the erasing mode. In the erasing mode, the scrolling direction display portion 23 displays a mark 23-6 and in this condition when the scrolling direction selection switch 21 is depressed, the central processing unit 17 enters the display mode again and displays the arrow 23-1 on the scrolling direction display portion 23, so that the user can be informed that this pager enters the message display mode again. At the same time the central processing unit 17 displays the page 1—1 on the message display portion 25. Therefore, the mode of the central processing unit 17 is changed by only two switches and thus, provides the selection among the scrolling modes in four directions and other modes, for example, the waiting and erasing modes. Because there is the scrolling direction (mode) display 23, the number of the modes can be increased by providing marks representing respective modes.

In the erasing mode, when the user depresses the scrolling switch 22, the displayed message are erased. Alternatively, it is also possible that in the erasing mode, when the user depresses the scrolling switch 22, all stored messages are erased. Moreover, these two erasing modes can be selected by providing a mark for erasing messages in addition to the mark 23-6.

Figure 5:
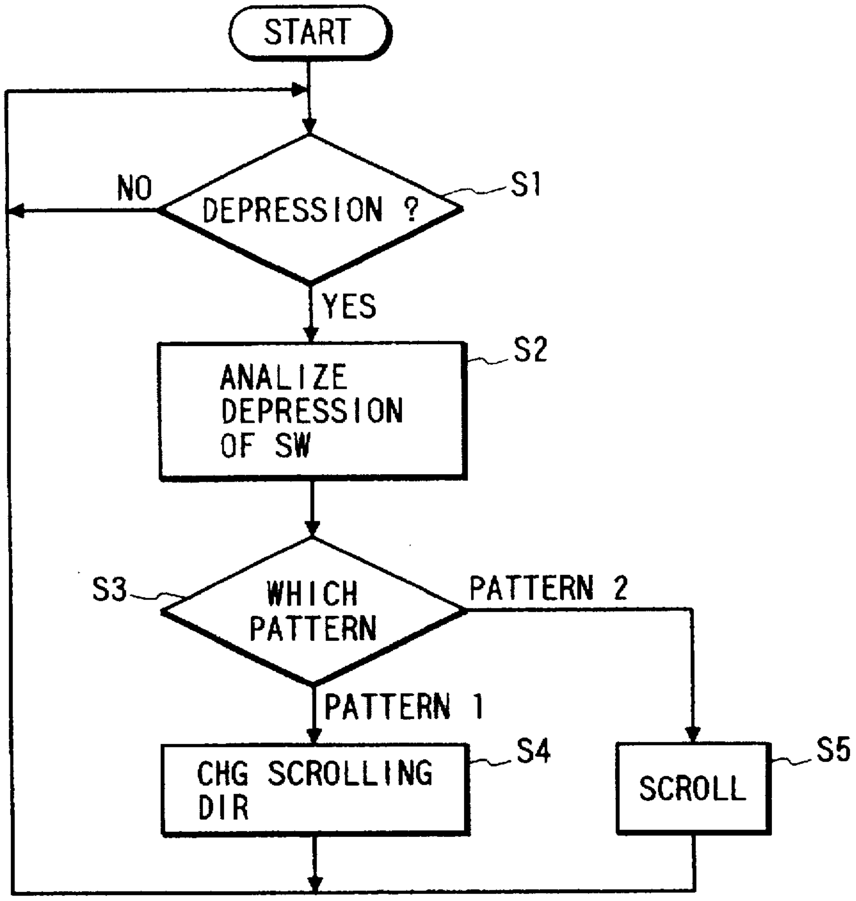
FIG. 5 is a diagram of a flow chart of a second embodiment.
Figure 6:
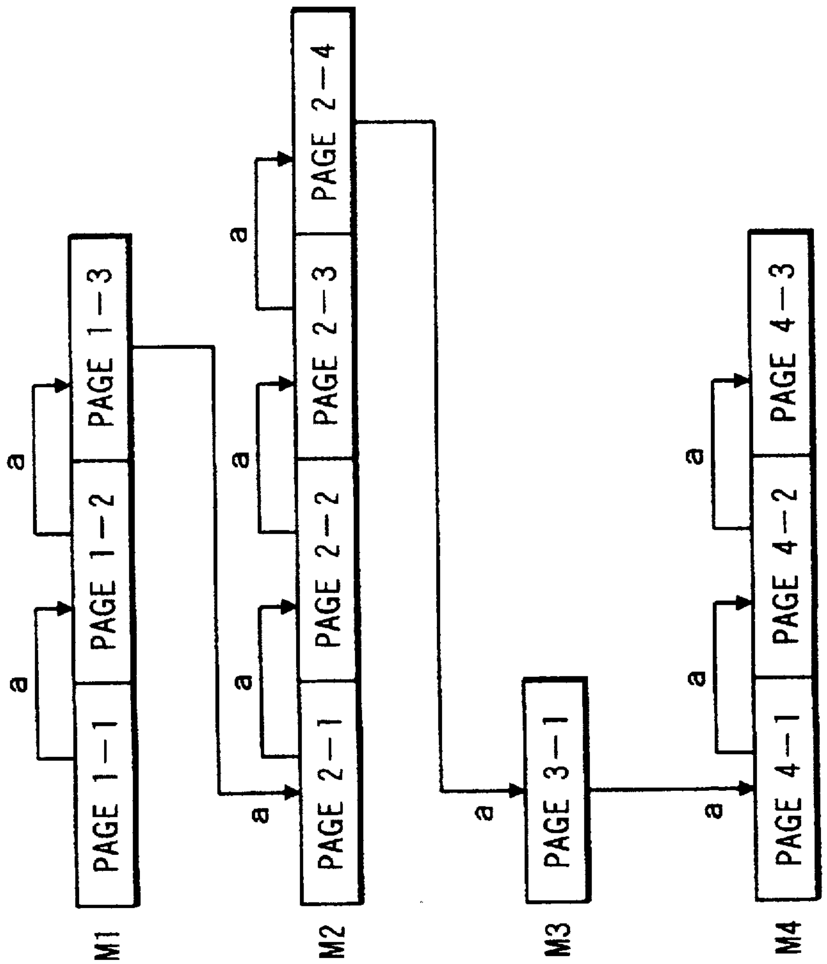
FIG. 6 PRIOR ART
FIGS. 6 to 8 are illustrations of prior art displaying operations.
Figure 7:
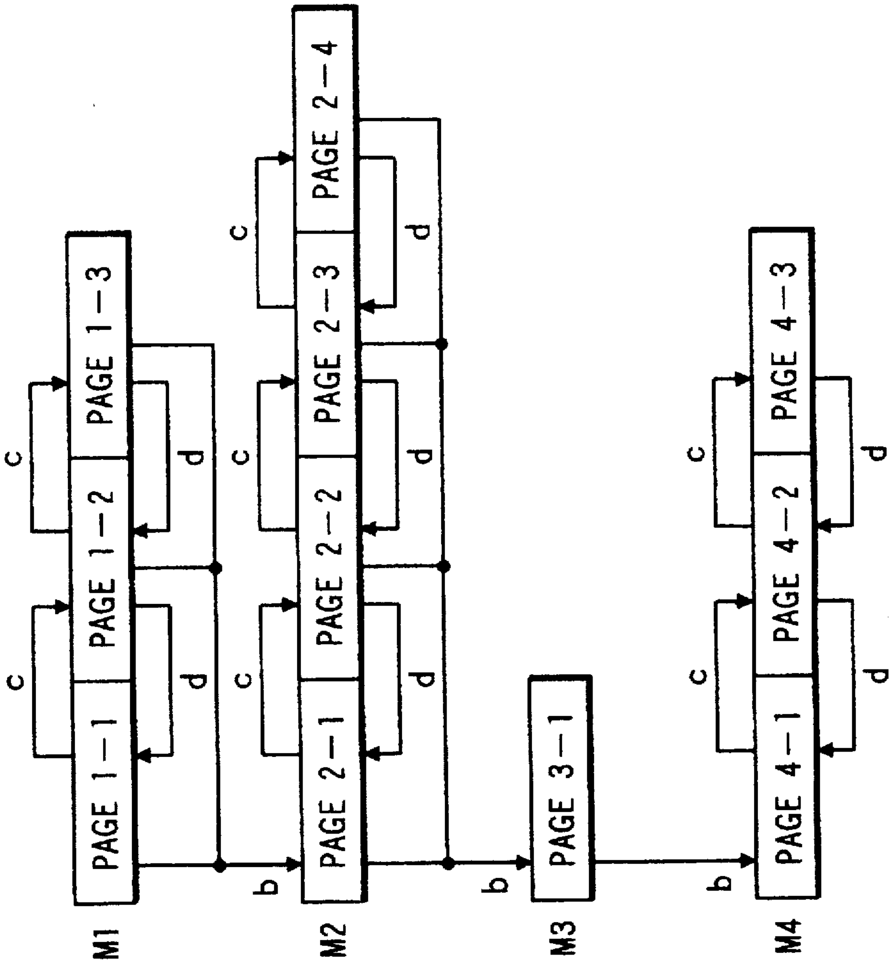
FIG. 7 PRIOR ART
Figure 8:
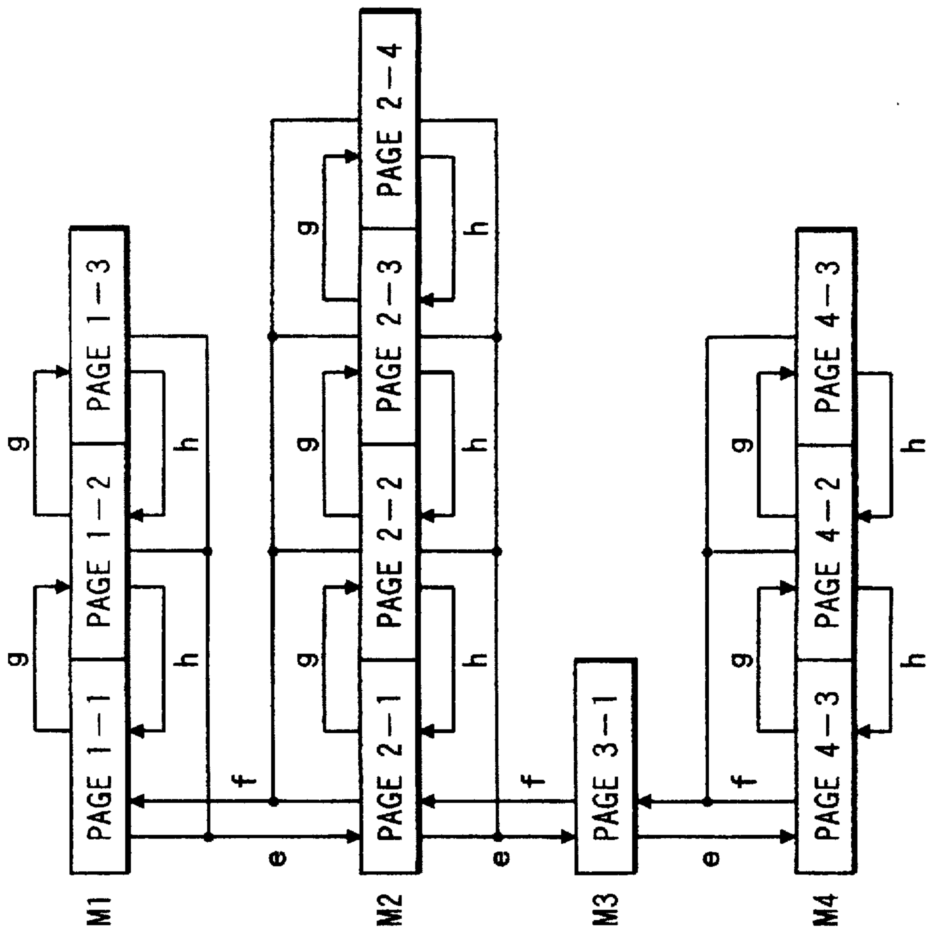
FIG. 8 PRIOR ART

A second embodiment of this invention will be described. The basic structure is similar to the first embodiment shown in FIG. 1. A first difference is in that either of the scroll direction selection switch 21 or the scrolling switch 22 is omitted. In this embodiment, the scrolling switch 22 is omitted. A second difference is in the program stored in the central processing unit 17. FIG. 5 is a diagram of a flow chart of the second embodiment.

In step s1, the central processing unit 17 waits the depression of the scroll direction selection switch 21. When there is depression of the scrolling direction selection switch 21, the central processing unit 17 analyzes the depression of the scrolling direction selection switch 21. That is, if a duration of the depression of the scrolling direction selection switch 21 is shorter than a predetermined interval, the central processing unit 17 Judges that a scrolling direction selection (mode selection) is commanded in step s3, so that in the following step s4, the central.processing unit 17 changes the scrolling direction or changes the mode of the pager, for example, the mode is change to the message erasing mode. If the duration of the depression of the scrolling direction selection switch 21 is not shorter than the predetermined interval in step s3, the central processing unit 17 judges that a scrolling is commanded, so that the central processing unit 17 executes the scrolling or other function in the selected mode in accordance with the selected scrolling direction or selected mode in step s5. The interval of the depression is measured by the timer 34.

There are variation in the analyzing processing. For example, a command for the scrolling direction selection (mode selection) can be detected by two consecutive depressions of the scrolling direction selection switch 21 within a second predetermined interval and a command for the scrolling (executing the function in the selected mode) is detected by one depression of the scrolling direction selection switch 21 within the second predetermined interval. That is, the central processing unit 17 starts the timer included therein in response to the first depression of the switch 21 and reads the interval measured by the timer in response to the following depression of the switch 21 and analyzes the interval. Moreover, the scrolling direction selection and the scrolling are detected by discriminating between two connective depressions and a single long period depression of the switch 21.

According to this invention, the displaying the scrolling direction prevents an erroneous operation by the user and because the number of the switches is little, so that the operationability can be improved and a manufacturing cost of this pager can be reduced.

As mentioned above, the pager according to this invention, having a plurality of predetermined functions, comprises: a receiving portion including the radio wave receiving portion 12, demodulator 13, and the decoder 16, for receiving the radio wave signal 10 including first identification code information 28 and a block of message information 29; a first storing portion, comprising the ID ROM 14, for storing second identification code information 30; a second storing portion, comprising the character ROM 26, for storing font image data; the central processing unit 17 comparing the first identification information with the second identification code information; the storing portion 18 for storing the block message information every the first identification information 28 agrees with the second identification information 30 to accumulate a plurality of the blocks of message information M1 to M4; the scrolling direction selection switch 21 and the scrolling switch 22 responsive to operations of a user respectively; the central processing unit 17 selecting one of the plurality of predetermined functions in response to the scrolling direction selection switch 21; the scrolling direction (mode) display portion 23 for displaying the selected one of the plurality of predetermined functions; the message display portion 25, having the predetermined display area, for displaying one of the plurality of the block of message information in the horizontal direction HOR DIR, the central processing unit 17 effecting the selected function in response to the scrolling switch 22.

The plurality of predetermined functions includes a first display function (23-2) for displaying a first block M1 of the plurality of blocks of message information using the font image data to have a displayed image at the predetermined display area of the message display portion 25 with scrolling the displayed image controlled in the first horizontal direction HOR DIR by the scrolling switch 22, the second display function (23-4) for displaying the first block of the plurality of blocks of message information with scrolling the displayed image controlled by the scrolling switch 22 in the second horizontal direction which is opposite to the first horizontal direction HOR DIR, the third display function (23-1) for displaying a second block M2 of the plurality of blocks of message information when the scrolling switch 22 is operated and the first block M1 is displayed, and the fourth display function (23-3) for displaying the first block of the plurality of blocks of message information M1 when the scrolling switch 22 is operated and the second block M1 is displayed.

In the above mentioned pager, the scrolling direction display portion 23 displays the display function (mode), such that the first horizontal direction HOR DIR is indicated when the first display function (23-2) is selected, such that the second horizontal direction is indicated when the second display function (23-4) is selected, such that a downward direction is indicated (23-1) when the third display function is selected, and such that an upward direction (23-3) is indicated when the fourth display function is selected.

In the above mentioned pager, the plurality functions may include an erasing function 28 and the central processing unit 17 may erase at least one of plurality of blocks of the message information stored in the storing portion 18 or all blocks of the message information.

In the above mentioned pager, one of the plurality of predetermined functions is selected in response to the scrolling direction selection switch 21 such that one of the plurality of predetermined functions is selected recurrently in a predetermined order as shown in FIG. 4A.

Moreover, in the case where the scrolling direction selection switch 21 or the scrolling switch 22 is omitted, the central processing unit 17 analyzes the operation of the remaining switch 21 and classifying said operation into first and second patterns PATTERN 1 and PATTERN 2. The central processing unit 17 analyzes the operation using the timer 34 for measuring the duration of the operation of the remaining switch 21 and the central processing unit 17 classifies the operation into said first and second patterns PATTERN 1 and PATTERN 2 in accordance with the detected duration. Moreover, the central processing unit 17 may classify the operation into first and second patterns PATTERN 1 and PATTERN 2 in accordance with whether or not the command signal 34 is further generated within the predetermined interval using the timer 34. The scrolling mode, the erasing mode, and the waiting mode are executed as shown in FIGS. 3 and 4 as similar to the first embodiment.

What is claimed is:

1. A pager comprising:

receiving means for receiving a radio wave signal including first identification code information and message information;

first storing means for storing a second identification code information assigned to said pager;

second storing means for storing font image data;

third storing means for storing said message information when said first identification information agrees with said second identification information;

first and second switches;

selection means for selecting one of a plurality of scrolling directions of said message information in said third storing means in response to operation of said first switch;

scrolling means for scrolling said message information in response to operation of said second switch;

first display means for displaying the selected scrolling direction in a predetermined scroll direction display area; and second display means, having a predetermined message display area separate and distinct from the scroll direction display area, for displaying said message information from said third storing means using said font image data from said second storing means;

wherein said scrolling means scrolls said message information on said second display means in accordance with a selected scrolling direction selected by said selection means while the selected scrolling direction is displayed on said first display means.

2. A pager as claimed in claim 1, wherein said selection means further selects one selected item from a group comprising a plurality of said scrolling directions and a plurality of operating functions, and said first display means displays the one selected item while said second display means displays said message information when the selected item is one of said plurality of scrolling directions.

3. A pager comprising:

receiving means for receiving a radio wave signal including first identification code information and message information;

first storing means for storing a second identification code information assigned to said pager;

second storing means for storing font image data;

third storing means for storing said message information when said first identification information agrees with said second identification information;

switching means for generating a switching signal in response to operation by a user;

selection means for selecting one of a plurality of scrolling directions of said message information in said third storing means in response to the switching signal generated by said switching means;

scrolling means for scrolling said message information in response to the switching signal generated by said switching means;

first display means for displaying the selected scrolling direction in a predetermined scroll direction display area; and second display means, having a predetermined message display area separate and distinct from the scroll direction display area, for displaying said message information from said third storing means using said font image data from said second storing means;

wherein said scrolling means scrolls said message information on said second display means in accordance with a selected scrolling direction selected by said selection means while the selected scrolling direction is displayed on said first display means.

4. A pager as claimed in claim 3, wherein said selection means selects one of said plurality of scrolling directions and said scrolling means scrolls the message information based on a detection of a pattern in the operation of said switching means.

* * * * *